(12) United States Patent
Young

(10) Patent No.: US 12,149,063 B2
(45) Date of Patent: Nov. 19, 2024

(54) SYSTEM AND METHOD FOR RESTRAINING DIFFERENTIAL BIAS

(71) Applicant: SCHNEIDER ELECTRIC (AUSTRALIA) PTY LTD., Macquarie Park (AU)

(72) Inventor: Ian David Young, Sydney (AU)

(73) Assignee: SCHNEIDER ELECTRIC (AUSTRALIA) PTY LTD., Macquarie Park (AU)

( * ) Notice: Subject to any disclaimer, the term of this patent is extended or adjusted under 35 U.S.C. 154(b) by 91 days.

(21) Appl. No.: 18/046,730

(22) Filed: Oct. 14, 2022

(65) Prior Publication Data

US 2024/0106225 A1  Mar. 28, 2024

Related U.S. Application Data

(60) Provisional application No. 63/410,891, filed on Sep. 28, 2022.

(51) Int. Cl.
*H02H 3/10* (2006.01)
*H02H 3/28* (2006.01)

(52) U.S. Cl.
CPC ............ *H02H 3/105* (2013.01); *H02H 3/283* (2013.01)

(58) Field of Classification Search
CPC ......... H02H 7/045; H02H 3/105; H02H 3/283
See application file for complete search history.

(56) References Cited

U.S. PATENT DOCUMENTS

| 4,121,122 | A | 10/1978 | Pokrandt |
| 7,906,970 | B2 | 3/2011 | Gangadharan et al. |
| 2018/0358802 | A1 | 12/2018 | Brncic et al. |

FOREIGN PATENT DOCUMENTS

| EP | 1273083 B1 | 6/2014 |
| EP | 3408910 A1 | 12/2018 |
| JP | H0530636 A | 2/1993 |
| JP | H08168165 A | 6/1996 |
| WO | 2017129233 A1 | 8/2017 |

OTHER PUBLICATIONS

Chaudhari Devyani et al: "Common differential relaying scheme for the protection of various transformer configurations", 2015 5th Nirma University International Conference on Engineering (Nuicone), IEEE, Nov. 26, 2015 (Nov. 26, 2015), pp. 1-6, XP032890555, DOI: 10.1109/NUICONE.2015.7449649 [retrieved on Apr. 7, 2016].
Extended European Search Report from corresponding European Application No. 23199420.3 dated Mar. 1, 2024.

*Primary Examiner* — Peter M Novak
(74) *Attorney, Agent, or Firm* — Lando & Anastasi, LLP

(57) ABSTRACT

Examples of the disclosure include a system for modifying a trip level of a circuit, the system comprising a protection device configured to activate responsive to a differential current exceeding the trip level, a first current transformer coupled to an input of the circuit, a second current transformer coupled to the output of the circuit, at least one measurement circuit coupled to the first current transformer and to the second current transformer, the at least one measurement circuit being configured to obtain a first current measurement from the first current transformer, obtain a second current measurement from the second current transformer, determine a bias current based on the first current measurement and the second current measurement, and modify the trip level of the protection device based on the bias current.

24 Claims, 5 Drawing Sheets

SYSTEM AND METHOD FOR RESTRAINING DIFFERENTIAL BIAS

CROSS-REFERENCE TO RELATED APPLICATIONS

This application claims priority under 35 U.S.C. § 119(e) to U.S. Provisional Application Ser. No. 63/410,891, titled "SYSTEM AND METHOD FOR RESTRAINING DIFFERENTIAL BIAS," filed on Sep. 28, 2022, which is hereby incorporated by reference in its entirety for all purposes.

BACKGROUND

Current transformers are often used to measure current in electrical systems. Protection relays may be used to detect fault conditions in the circuit and activate fault-protection measures, such as by opening breakers and/or other forms of blocking to mitigate or eliminate the fault.

SUMMARY

According to at least one aspect of the present disclosure a system for modifying a trip level of a circuit is provided, the system comprising a protection device configured to activate responsive to a differential current exceeding the trip level, a first current transformer coupled to an input of the circuit, a second current transformer coupled to the output of the circuit, at least one measurement circuit coupled to the first current transformer and to the second current transformer, the at least one measurement circuit being configured to obtain a first current measurement from the first current transformer, obtain a second current measurement from the second current transformer, determine a bias current based on the first current measurement and the second current measurement, and modify the trip level of the protection device based on the bias current.

In various examples, the at least one measurement circuit is further configured to modify the trip level responsive to determining that a transformer coupled to the circuit is saturated. In some examples, the at least one measurement circuit is further configured to determine that the transformer is saturated based on the differential current. In at least one example, the differential current is based on a sum of the first current measurement and the second current measurement. In various examples, the at least one measurement circuit is further configured to determine that the transformer is saturated based on a reduction in the bias current. In some examples, modifying the trip level of the protection device includes adding a bias value to the trip level.

In at least one example, the bias value is determined based on the maximum of, the differential current, a previously determined bias value, and a multiple of a change in the bias current. In various examples, the change in the bias current is based on a previous bias current. In some examples, the bias value decays at an exponential rate based on a time constant that is greater than a system time constant. In at least one example, the at least one measurement circuit further comprises a first measurement block coupled to the first current transformer and configured to measure and sample a first current, a frequency tracking circuit coupled to the first measurement block and configured to track a frequency of the first current, and a differential function circuit coupled to the first measurement block and configured to calculate one or more of a differential current, the bias current, and a bias value.

In various examples, the first measurement block further comprises an anti-aliasing filter coupled to the first current transformer and configured to prevent quantization errors when obtaining the first current measurement, an analog-to-digital converter (ADC) coupled to the anti-aliasing filter and configured to sample and digitize the first current measurement, a digital filter coupled to the ADC and to the frequency tracking circuit and configured to compensate for a frequency response of at least the ADC, a tracking circuit coupled to the digital filter and to the frequency tracking circuit and configured to sample a frequency of the first current measurement, and a Fourier measurement circuit coupled to the tracking circuit and to the differential function circuit and configured to calculate Fourier values based on the first current measurement. In some examples, the system includes a second measurement block coupled to the second current transformer, the frequency tracking circuit, and the differential function circuit.

According to at least one aspect of the disclosure, a method of modifying a trip level of a circuit is provided comprising measuring an induced current from a current transformer to obtain an induced current measurement, converting the induced current measurement to a voltage, sampling the voltage to obtain voltage samples, calculating one or more Fourier values based on the voltage samples, calculating a bias current responsive to calculating the one or more Fourier values, calculating a differential current responsive to calculating the one or more Fourier values, determining if a transformer is experiencing saturation responsive to calculating the bias current and the differential current, and modifying a trip level of a protection device responsive to determining the transformer is experiencing saturation.

In some examples, the method includes determining that the transformer is experiencing saturation based on the bias current. In various examples, the method includes determining that the transformer is experiencing saturation based on the differential current. In at least one example, the method includes determining a bias value based on one or more of the bias current, the differential current, and an earlier bias value. In some examples, modifying the trip level of the protection device includes adding the bias value to the trip level. In various examples, the bias value added to the trip level decays at an exponential rate based on a time constant that is greater than a system time constant. In at least one example, the method includes providing the voltage samples to an anti-aliasing filter to prevent a quantization error responsive to converting the induced current measurement to the voltage. In some examples, determining the differential current and determining the bias current are based on the Fourier values.

According to at least one aspect of the disclosure, a non-transitory computer-readable medium storing thereon instructions configured to instruct at least one processor to measure an induced current from a current transformer to obtain an induced current measurement, convert the induced current measurement to a voltage, sample the voltage to obtain voltage samples, calculate one or more Fourier values based on the voltage samples, calculate a bias current responsive to calculating the one or more Fourier values, calculate a differential current responsive to calculating the one or more Fourier values, determine if a transformer is experiencing saturation responsive to calculating the bias current and the differential current, and modify a trip level of a protection device responsive to determining that the transformer is experiencing saturation.

In some examples, the instructions further instruct the at least one processor to determine that the transformer is experiencing saturation based on the bias current. In various examples, the instructions further instruct the at least one processor to determine that the transformer is experiencing saturation based on the differential current. In at least one example, the instructions further instruct the at least one processor to determine a bias value based on one or more of the bias current, differential current, and an earlier bias value. In some examples, the instructions further instruct the at least one processor to modify the trip level of the protection device by adding the bias value to the trip level. In various examples, the bias value added to the trip level decays at an exponential rate based on a time constant that is greater than a system time constant. In at least one example, the instructions further instruct the at least one processor to determine the differential current and the bias current based on the one or more Fourier values.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Figure 1A:
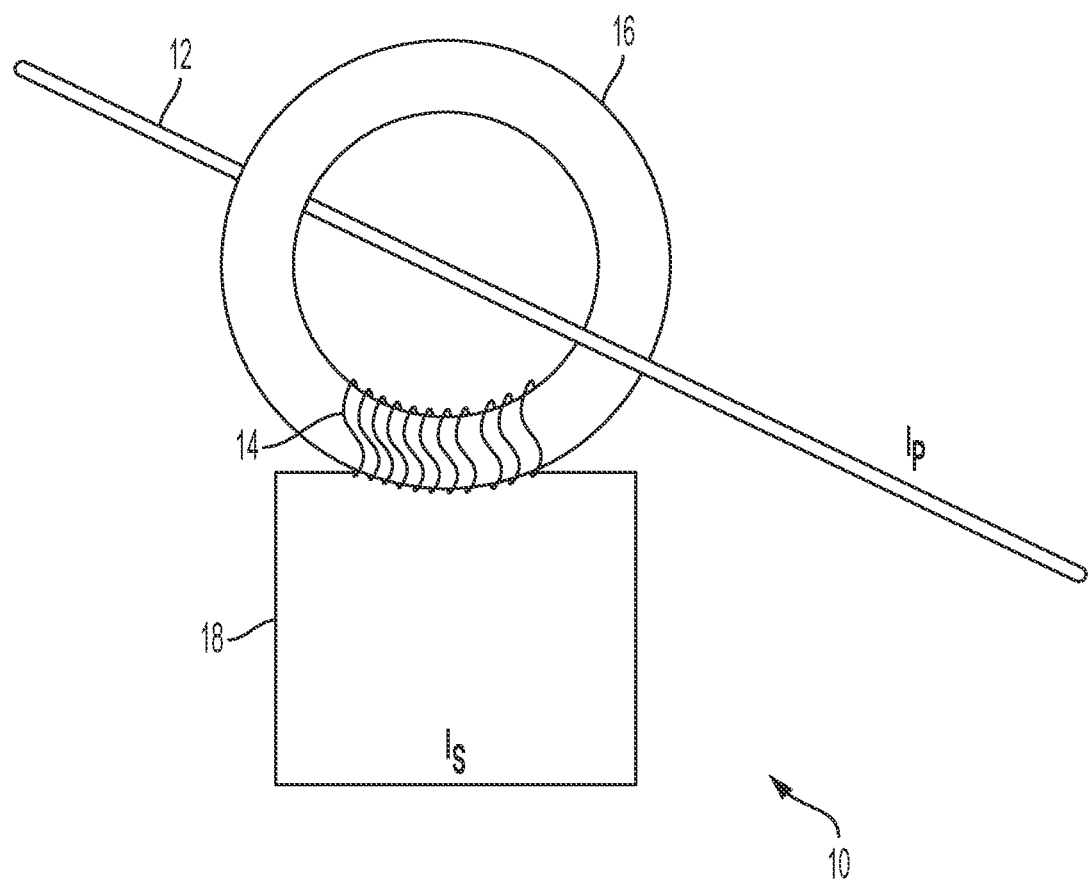
FIG. 1A illustrates a current transformer according to an example.

FIG. 1A illustrates a current transformer 10 according to an example. The current transformer 10 includes a primary winding 12, a secondary winding 14, a core 16, and, optionally, a circuit loop 18. The primary winding 12 may conduct a primary AC current, IP. The secondary winding 14 and/or circuit loop 18 may conduct a secondary AC current, $I_S$. Secondary current $I_S$ may be a current induced in the secondary winding 14 by the primary current IP.

The primary winding 12 may pass through the core 16, and may be electromagnetically coupled to the core 16 and the secondary winding 14. In some examples, the primary winding 12 may also be physically coupled to the secondary winding 14 and/or core 16. The secondary winding 14 is coupled to the core 16. In some examples, the secondary winding 14 may be wound around the core 16, and may have a large number of turns, for example, hundreds or thousands, around the core 16. The secondary winding 14 may be coupled to the circuit loop 18. For example, a first end of the secondary winding 14 may be coupled to a first end of the circuit loop 18, and a second end of the secondary winding 14 may be coupled to a second end of the circuit loop 18. The secondary winding 14 may be wound around the entire circumference of the core 16 or only a portion of the core 16. In FIG. 1A, the secondary winding 14 is illustrated as being wound around only a portion of the circumference of the core 16.

The primary current, IP, passing through the primary winding 12 may induce a secondary current, $I_S$, on the secondary winding 14. $I_S$ may pass through the secondary winding 14 and the circuit loop 18. The magnitude of $I_S$ depends, in some examples, on the material and electromagnetic characteristics of the core 16 and on the ratio of turns in the secondary winding 14 compared to the primary winding 12. The core 16 may be composed of any of various materials, such as a material having a strong magnetic field or being susceptible to magnetization. In some examples, the core 16 may be made of a ferromagnetic material. In some examples, the core 16 may be a ring shape, having a hollow center portion through which the primary winding 12 may pass. In some examples, the core 16 may be omitted.

For the purposes of clarity, secondary windings referred to herein may be assumed to include a core, even if not mentioned or illustrated. However, secondary windings described herein need not include a core.

Figure 1B:
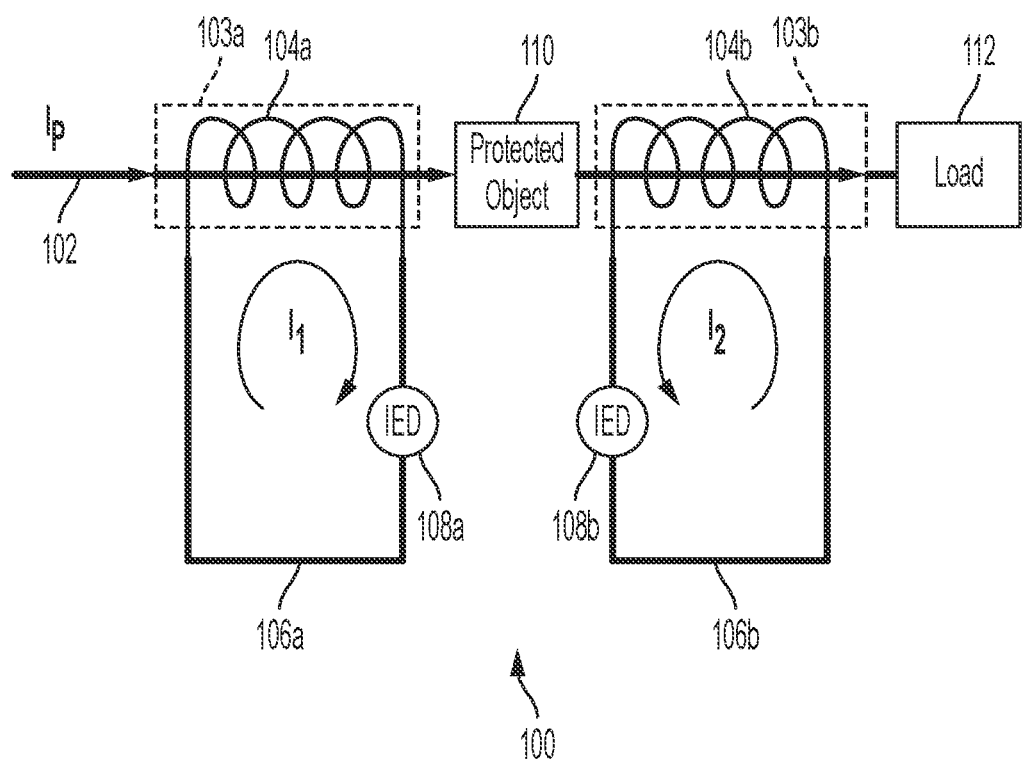
FIG. 1B illustrates a current transformer fault protection system according to an example.

FIG. 1B illustrates a current transformer fault protection system 100 according to an example. The system 100 includes a primary winding 102 which can conduct a primary current $I_P$, a first current transformer (CT) 103a, a second CT 103b, a first secondary winding 104a, a second secondary winding 104b, a first circuit 106a which can conduct a first current $I_1$, a second circuit 106b which can conduct a second current I₂, a first measurement circuit 108a, a second measurement circuit 108b, a protected object 110, and a load 112. The protected object 110 may be any type of circuit or electrical device, and may include motors, generators, busbars, feeders, or other equipment. The load 112 may also be any type of electrical device.

The primary winding 102 may pass through the center of the secondary windings 104a, 104b. The first CT 103a may include the combination of the primary winding 102 and the secondary winding 104a. The second CT 103b may include the combination of the primary winding 102 and the second secondary winding 104b. The primary winding 102 may be coupled to the protected object 110 and may provide electrical power to the protected object 110. The primary winding 102 may be coupled to the load 112 and may provide electrical power to the load 112. In some examples, the primary winding 102 may provide AC power to the protected object 110 and/or the load 112. The primary winding 102 may or may not be physically coupled to the secondary windings 104a, 104b, but will be electromagnetically coupled to the secondary windings 104a, 104b so as to induce a current in the secondary windings 104a, 104b. The secondary windings 104a, 104b may have a given number of turns, and are coupled to respective circuits 106a, 106b which are coupled to measurement circuits 108a, 108b. The measurement circuits (IEDs) 108a, 108b are configured to measure the current induced in the secondary windings 104a, 104b. The induced current in the first secondary winding 104a is I₁ and the induced current in the second secondary winding 104b is I₂ in FIG. 1B. I₁ and I₂ represent the currents in the respective circuits 106a, 106b.

The first secondary winding 104a provides an induced current I₁ based on $I_P$ to the measurement circuit 108a, and the second secondary winding 104b provides an induced current I₂ to the measurement circuit 108b. In normal operation of the protected object 110, the current $I_P$ passing into the protected object 110 may be equal to the current $I_P$ passing out of the protected object 110. If the current $I_P$ passing into the protected object 110 is equal to the current $I_P$ passing out of the protected object 110, and assuming for purposes of explanation that the secondary windings 104a, 104b are substantially identical—for example, by having similar material properties and the same number of turns per winding—then I₁ may be equal or approximately equal to I₂ during normal operation of the protected object 110.

The load 112 may receive $I_P$ from the current transformer 103b. The load 112 may include a component capable of experiencing saturation, such as a transformer. The load 112 may experience faults (for example, ground or earth faults, bolted shorts, arcs, three phase-faults, and so forth) and/or inrush. During a fault, the primary winding 102 may see a short-circuit or similar condition at the load 112. During inrush, the primary winding 102 may see through inrush from the protected object 110 to the load 112. Inrush at the load 112 means, in some examples, that the transformer component of the load 112 has become saturated, and as a result, the secondary of the load 112 transformer is not outputting a current.

Inrush may occur, for example, when a system such as the load 112 is switched on. Activating part of all of the load 112 may result in a temporary, high current $I_P$ on the primary winding 102. In some examples, the temporary, high current $I_P$ will settle to a lower current $I_P$ reflective of normal operating conditions. The inrush current may be transitory and/or harmless, but may be difficult to distinguish from a fault from the perspective of a circuit-protection device, such as a fuse or circuit breaker.

Saturation refers to when the core of a transformer (for example, the cores of the current transformers 103a, 103b or of the load 112 transformer) approaches and/or reaches the maximum flux that the core can experience. When saturation occurs, the secondary winding of the transformer no longer sees change in the magnetic field of the core, and thus the secondary current, which may depend on the change in flux in the core, may fall to zero or very low values.

The system 100 may compare a differential current and a bias current, and adjust a trip level of the circuit-protection devices based on the comparison. The differential current may be a measurement of the sum or difference of I₁ and I₂. The bias current may be determined relative to I₁ and I₂. The trip level (or trip threshold) of the system 100 may be a value at which one or more circuit-protection devices in the system 100 (for example, fuses, blocking, contactors, and so forth) are activated.

In some examples, the differential current may be calculated as:

$$I_{differential}=|I_1+I_2| \qquad (1)$$

As shown in FIG. 1B, currents I₁ and I₂ have opposite directions, and thus, by convention, may be assigned opposite signs. Accordingly, since the magnitude of I₁ and I₂ may be equal, the differential current may normally equal zero absent saturation in the system 100, such as saturation caused by inrush or a fault condition.

In some examples, if the differential current rises above the trip level, the system 100 may activate circuit-protection devices. For example, a breaker may be opened, or other parts of the system 100 may be blocked (as will be described in greater detail with respect to FIG. 2). The circuit-protection devices that are activated may be located on any part of the system 100. For example, circuit-protection devices may be positioned to protect the load 112, the protected object 110, the circuits 106a, 106b, or any other part of the circuit.

However, because the differential current may rise when there is a fault or inrush, as described above, the system 100 may take protective action whether or not a fault actually has occurred. However, it may be undesirable to take protective action and/or perform blocking during inrush or fault conditions, since inrush is typical of turning on the load 112 and may be harmless, necessary, and/or ordinary, and external faults may be addressed using other methods. Inrush may be transitory in nature, often lasting for no more than a few milliseconds, and may not pose a substantial threat to the system 100. Thus, taking protective action and/or blocking the parts of the system 100 during inrush or fault conditions may be inefficient and even harmful to the system 100.

Figure 2:
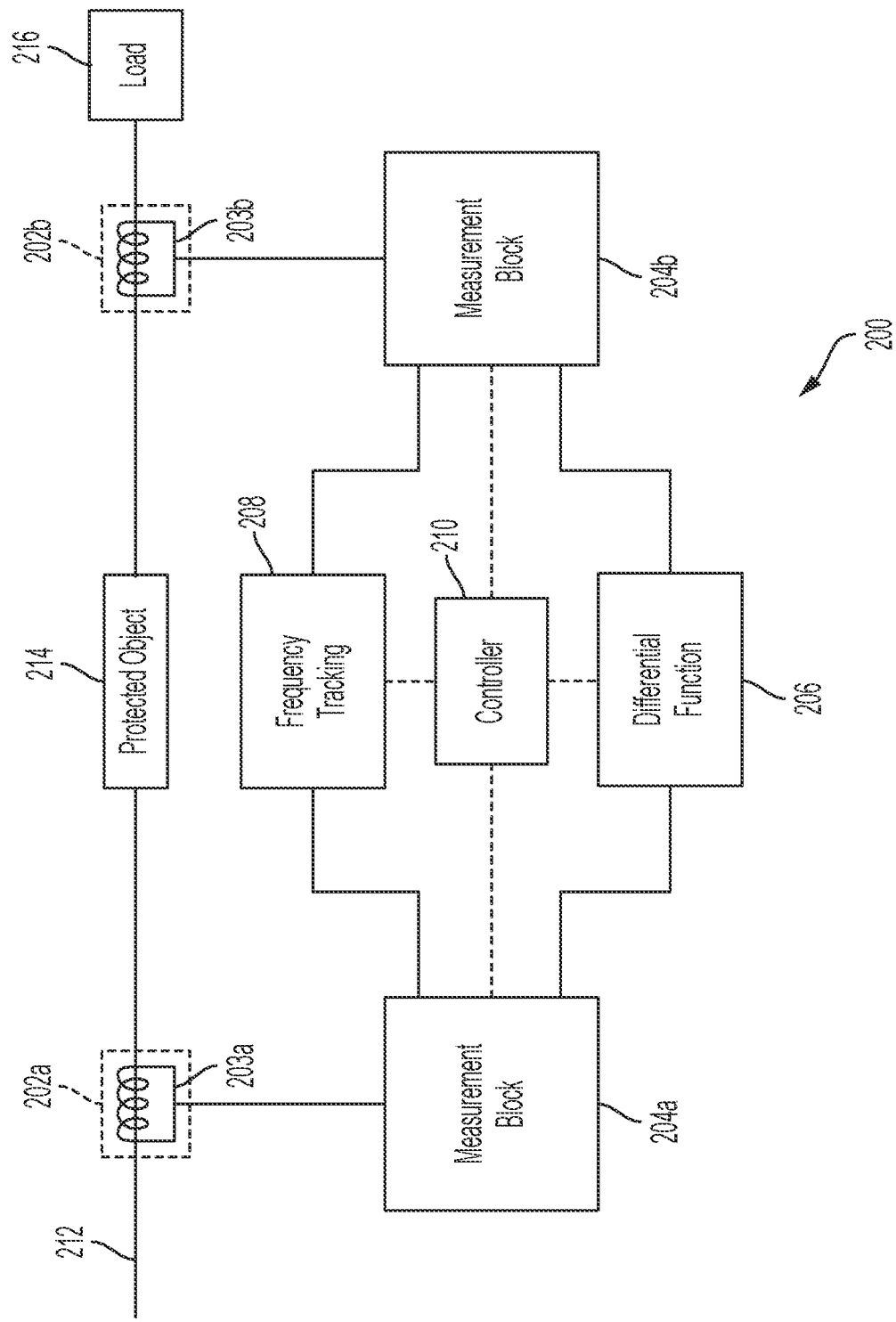
FIG. 2 illustrates a current transformer fault protection system according to another example.

FIG. 2 illustrates a current transformer fault protection system 200 according to another example. The system 200 includes a first current transformer 202a, a second current transformer 202b, a first measurement block 204a, a second measurement block 204b, a differential function circuit 206, a frequency tracking circuit 208, a controller 210, a primary winding 212, a protected object 214, and a load 216. Each current transformer 202a, 202b, may include a respective secondary winding 203a, 203b.

The first current transformer 202a is coupled to the first measurement block 204a, and the second current transformer 202b is coupled to the second measurement block 204b. Each respective measurement block 204a, 204b is configured to measure the current induced on the respective current transformer 202a, 202b. The measurement blocks 204a, 204b will be discussed in greater detail with respect to FIG. 3. Each measurement block 204a, 204b is coupled to the frequency tracking circuit 208 and the differential function circuit 206. The controller 210 may be coupled to the measurement blocks 204a, 204b, the differential function circuit 206, and/or the frequency tracking circuit 208. However, in some examples the controller 210 may not be necessary and the functions performed by the controller 210 may be distributed among the measurement blocks 204a, 204b, differential function circuit 206, and/or frequency tracking circuit 208. The primary winding 212 may be physically and/or electromagnetically coupled to the secondary windings 203a, 203b of the current transformers 202a, 202b. The primary winding 212 may be coupled to the protected object 214 and to the load 216.

The primary winding 212 passes through the center of the secondary windings 203a, 203b of the current transformers 202a, 202b. A current in the primary winding 212 induces a current on the secondary windings 203a, 203b of each current transformer 202a, 202b. The first current transformer 202a provides a current to the first measurement block 204a based on the current passing into the protected object 214. The second current transformer 202b provides a current to the second measurement block 204b based on the current passing out of the protected object 214. As with the current transformers 103a, 103b of FIG. 1, the current induced on the secondary winding 203a of the first current transformer 202a by the primary winding 212 may equal the current induced on the secondary winding 203b of the second current transformer 202b by the primary winding 212, provided the number of turns on the winding of each transformer 202a, 202b and the other physical characteristics of the current transformers 202a, 202b are substantially equal.

The measurement blocks 204a, 204b digitize the respective currents received from the current transformers 102a, 102b. The current induced in the first current transformer 202a will be referred to as $I_1$ and the current induced in the second current transformer 202b will be referred as $I_2$, consistent with FIG. 1. Accordingly, the first measurement block 204a digitizes $I_1$ and the second measurement block 204b digitizes $I_2$. The measurement blocks 204a, 204b may digitize the currents $I_1$ and $I_2$ using, for example, an analog-to-digital converter (ADC), or any other appropriate method. The measurement blocks 204a, 204b may then provide the measured values of $I_1$ and $I_2$ to other parts of the system 200. The measurement blocks will be discussed in greater detail with respect to FIG. 3.

Once the measurement blocks 204a, 204b have digitized the respective currents, the digitized currents are provided by the measurement blocks 204a, 204b to a frequency tracking circuit 208 that measures the frequency of the digitized current and can be used to accurately measure the current and eliminate unwanted harmonics. The frequency tracking circuit 208 may provide to the measurement blocks 204a, 204b samples of the digitized current representative of the fundamental frequency current. The sample rate of the frequency tracking circuit 208 may be constant or variable.

The digitized current and/or samples of the digitized current are also provided to a differential function circuit 206. The differential function circuit 206 uses differential algorithms to analyze the digitized currents and determine whether an element of the system 100 has saturated. If the differential function circuit 206 determines that saturation has occurred or is occurring, the controller 210 may add a bias value to the trip level of the system 200, resulting in an increased trip level for the system 200. In some examples, the bias value is purely numeric, and may be added to a trip level value stored in storage and/or memory (such as solid-state memory, a register, and so forth). By increasing the trip level by the bias value, the system 200 may not activate any circuit-protection devices unless the differential current exceeds the increased trip level. The base measurements of the measurement circuits 204a, 204b, that is, the measurements of the induced currents $I_1$ and $I_2$, may not be affected by the bias value, and the operation of the transformers (whether in the load 216 or in current transformers 202a, 202b) is likewise not affected by the bias value.

In one example, the differential function circuit 206 may detect saturation based on a change in a bias current. For example, the bias current may be calculated as:

$$I_{bias} = \frac{|I_1| + |I_2|}{2} \tag{2}$$

In other examples, other calculations may be used to determine the bias current, for example, $\max(I_1, I_2)$, $$\frac{|I_1| + |I_2|}{2},$$

and so forth. The bias current may be extended for multiple current transformers beyond two. For example, with k current transformers on the primary 212, the bias current may be calculated as:

$$I_{bias} = \frac{|I_1| + |I_2| + \ldots + |I_k|}{2} \tag{3}$$

The bias current may change by increasing or decreasing depending on the equation used to calculate it. The bias current may change when the load drops, an external fault clears, or CT saturation occurs. For an internal fault, the bias current may increase.

If a differential exists between $I_1$ and $I_2$ and the bias current decreases using equation (2) or (3), then CT saturation may be occurring or may have occurred. Thus, if the controller 210 detects a drop in bias current and a differential between $I_1$ and $I_2$, CT saturation may be occurring or have occurred. To prevent protective action and/or blocking of the measurement blocks 204a, 204b, frequency tracking circuit 208, and/or differential function circuit 206, the controller 210 may apply a bias value to the trip level of the system 200. In some examples, the bias value may be based on the maximum of m times the bias reduction or the total differential current. In various examples, m may be any value, such as 1, 1.5, 3, 7, and so forth. Using m=3 as an example, the bias value may be based on:

$$\max(3 \cdot \Delta I_{bias}, I_{differential}) \tag{4}$$

In some examples, the bias value may be calculated recursively, based on portions of the system clock (cycles, half-cycles, quarter-cycles, and so forth) or other time periods. For example, the change in bias ($\Delta I_{bias}$) may be calculated over a different time period, for example, milliseconds or some other value.

$$I_{sat}[n] = \max(3 \cdot \Delta I_{bias}, I_{differential}, I_{sat}[n-1] \cdot e^{t/satTC}) \tag{5}$$

In equation (5), $I_{sat}$ is the bias value, "n" indicates the current measurement, and "n−1" indicates the previous measurement. For example, "n" may indicate the current half-cycle or quarter-cycle, and "n−1" may indicate the previous half-cycle or quarter-cycle. The bias value may be representative of missing current due to saturation. The bias value is, in some examples, directly proportional to the level of saturation of a transformer in the system 200, for example a transformer of the load 216. The bias value may decay in accordance with the saturation time constant "satTC," which may be set to be greater than the system time constant. In some examples, the bias value may decay exponentially. The bias value may be applied only to the affected phase of $I_P$ to ensure that other phases are not restrained unnecessarily.

The controller 210 may control any of the functions described above, including, but not limited to, controlling sampling by the measurement blocks 204a, 204b, frequency tracking by the frequency tracking block 208, and differential function operations of the differential function block 206.

Figure 3:
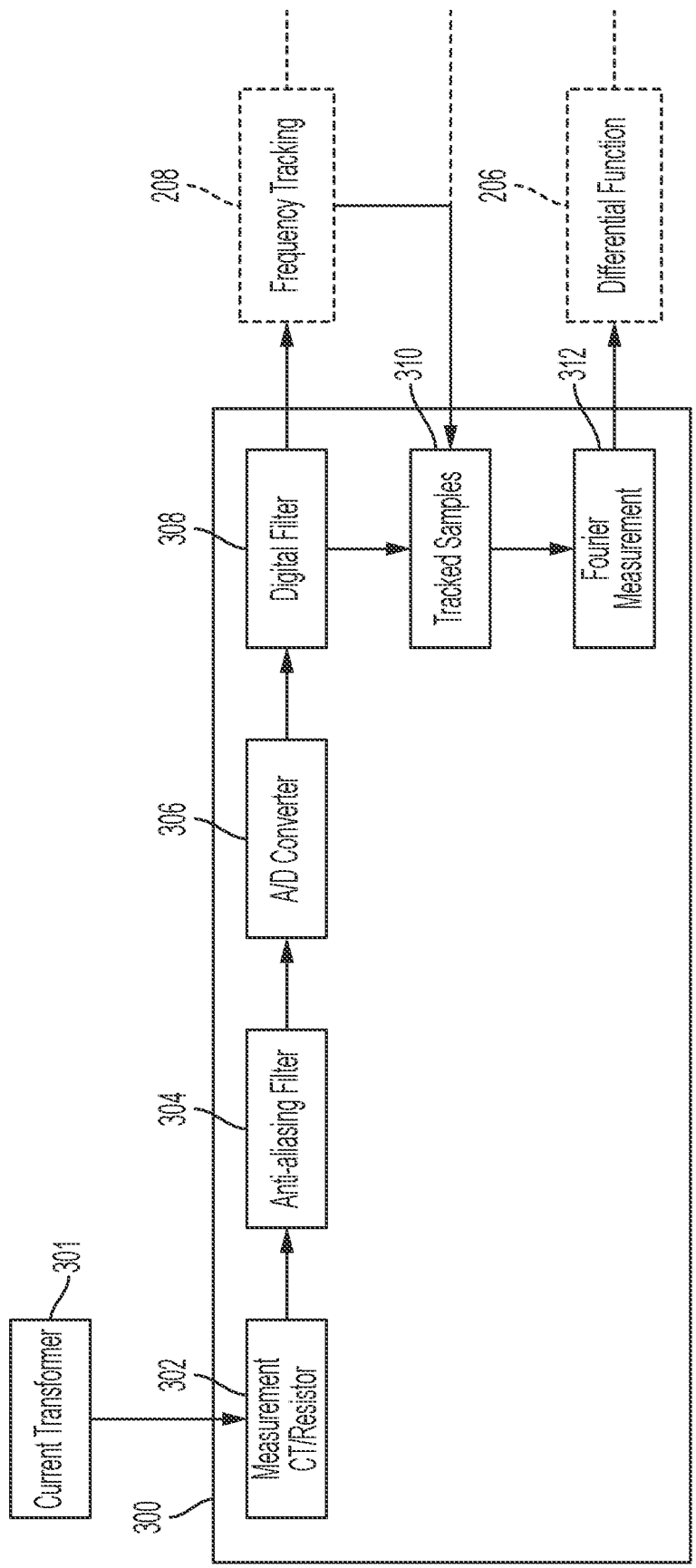
FIG. 3 illustrates a measurement block according to an example.

FIG. 3 illustrates a measurement block 300 according to an example. In some examples, the measurement blocks 204a, 204b may be implemented as measurement block 300, and measurement block 300 is suitable for use as a measurement block in FIG. 2.

The measurement block 300 includes a measurement CT/resistor 302 ("measurement resistor 302"), an anti-aliasing filter 304, an ADC 306, a digital filter 308, a tracked sample circuit 310, and a Fourier measurement circuit 312. Also illustrated is a current transformer 301 which may be suitable for use as a current transformer 202a, 202b in FIG. 2, and the frequency tracking circuit 208 and differential function circuit 206 of FIG. 2. The differential function circuit 206 and frequency tracking circuit 208 may be connected to more than one measurement block 300.

The current transformer 301 is coupled to the measurement resistor 302. The measurement resistor 302 is coupled to the current transformer 301 at a first connection and to the anti-aliasing filter 304 at a second connection. The anti-aliasing filter 304 is coupled to the measurement resistor 302 at a first connection and to the ADC 306 at a second connection. The ADC 306 is coupled to the anti-aliasing filter 304 at a first connection and is coupled to the digital filter 308 at a second connection. The digital filter 308 is coupled to the ADC 306 at a first connection, is coupled to the frequency tracking circuit 208 at a second connection, and is coupled to the tracked samples circuit 310 at a third connection. The tracked sample circuit 310 is coupled to the digital filter 308 at a first connection, is coupled to the frequency tracking circuit 308 at a second connection, and is coupled to the Fourier measurement circuit 312 at a third connection. The Fourier measurement circuit 312 is coupled to the tracked samples circuit 310 at a first connection and is coupled to the differential function circuit 206 at a second connection. Although not shown, the measurement block 300 may also be coupled to a controller, for example, the controller 210.

The current transformer 301 may provide an induced current to the measurement resistor 302. The measurement resistor 302 may convert the induced current to a voltage. For example, the current passing through the measurement resistor 302 will result in a voltage drop across the measurement resistor 302 which can be measured. In some examples, the secondary winding of the current transformer 301 is coupled to the primary winding of a second current transformer that is part of the measurement CT/resistor block 302. The second current transformer's secondary winding is, in this example, coupled to the measurement resistor of the measurement CT/resistor block 302. Both the current transformer 301 and the current transformer of the measurement CT/resistor block 302 may be step-up transformers, and thus may convert the current on their respective primary windings to a lower current with a higher voltage on their respective secondary windings. However, the measurement CT/resistor block 302 may have a resistor without a current transformer, or may not require a current transformer.

The voltage may be measured by and/or provided to the anti-aliasing filter 304 by the measurement resistor 302. In some examples, the anti-aliasing filter 304 may be configured to directly determine the voltage. The anti-aliasing filter 304 may prevent quantization errors when the voltage is converted to digital form. The anti-aliasing filter 304 then provides the voltage to the ADC 306.

The ADC 306 converts the voltage from analog form to digital form and provides the digitized voltage to the digital filter 308. The ADC 306 may be configured to sample the voltage at a fixed rate, a frequency tracked rate, or a variable rate. A frequency tracked rate is a rate tied to frequency, for example, 48 samples/cycle. Thus, for a higher frequency (more cycles per second) more samples are taken per second compared to a lower frequency (fewer cycles per second), but the same number of samples are taken per cycle for both the higher and lower frequency. The ADC 306 may have a high resolution and may use analog multiplication to further increase the resolution range. The digital filter 308 may be configured to compensate for the frequency response of the sampling circuit, for example, the ADC 306.

The digital filter 308 then provides the voltage to the frequency tracking circuit 208 and the tracked samples circuit 310. The frequency tracking circuit 208 tracks the frequency the sampled voltage, such as the frequency of the samples of the voltage provided by the ADC 306. The tracked frequency of the samples of the voltage may be used by the Fourier measurement circuit 312 to eliminate unwanted harmonics. The frequency tracking circuit 208 may also, if the ADC 306 is running at a fixed sampling rate, create a digitally produced sample stream of tracked samples that can be used by the Fourier measurement circuit 312 to measure the magnitude of the fundamental frequency current, for example, the magnitude of the fundamental frequency of $I_P$ or another current.

The frequency tracking information provided by the frequency tracking circuit 208 and the voltage from the digital filter 308 are received by the tracked samples circuit 310. The tracked samples circuit 310 may be any circuit appropriate to store the information that the tracked samples circuit 310 receives, for example, registers, memory, other forms of storage, and so forth. The tracked samples circuit 310 provides the tracked samples to the Fourier measurement circuit 312.

The Fourier measurement circuit 312 calculates, based on the received samples, the magnitude of the fundamental frequency current, for example, the magnitude of the fundamental frequency of $I_P$ and/or the induced current. The Fourier measurement circuit 312 provides the measurements to the differential function circuit 206, which applies the differential algorithms, as described with respect to FIG. 2 above and FIG. 4 below, to determine whether CT saturation is occurring and whether a saturation bias current is desirable. In some examples, the Fourier measurement circuit 312 may also determine and/or account for the phase of the measured currents. For example, $I_1$ and $I_2$ may be out of phase with one another by some amount, such as 180 degrees. The Fourier measurement circuit 312 may account for the phase difference of 180 degrees between the two currents by appropriately modifying the signs of the components of the currents. For example, if $I_1$ and $I_2$ are 180 degrees out of phase, but otherwise equal, then the signs of their components would be opposites and the sum of $I_1$ and $I_2$ would be zero. The Fourier measurement circuit 312 may therefore account for phase differences when other methods, for example, root-mean-square (RMS), would not.

Eliminating unwanted harmonics may not be necessary to identify saturation as described above, nor to modify the trip level by the bias value as described above. However, eliminating unwanted harmonics may be useful in other respects because the unwanted harmonics may arise due to current passing from one element of the circuit to another, rather than being representative of the primary current $I_P$. The data collected by the measurement block 300 may therefore be useful for other purposes if the unwanted harmonics are eliminated.

Figure 4:
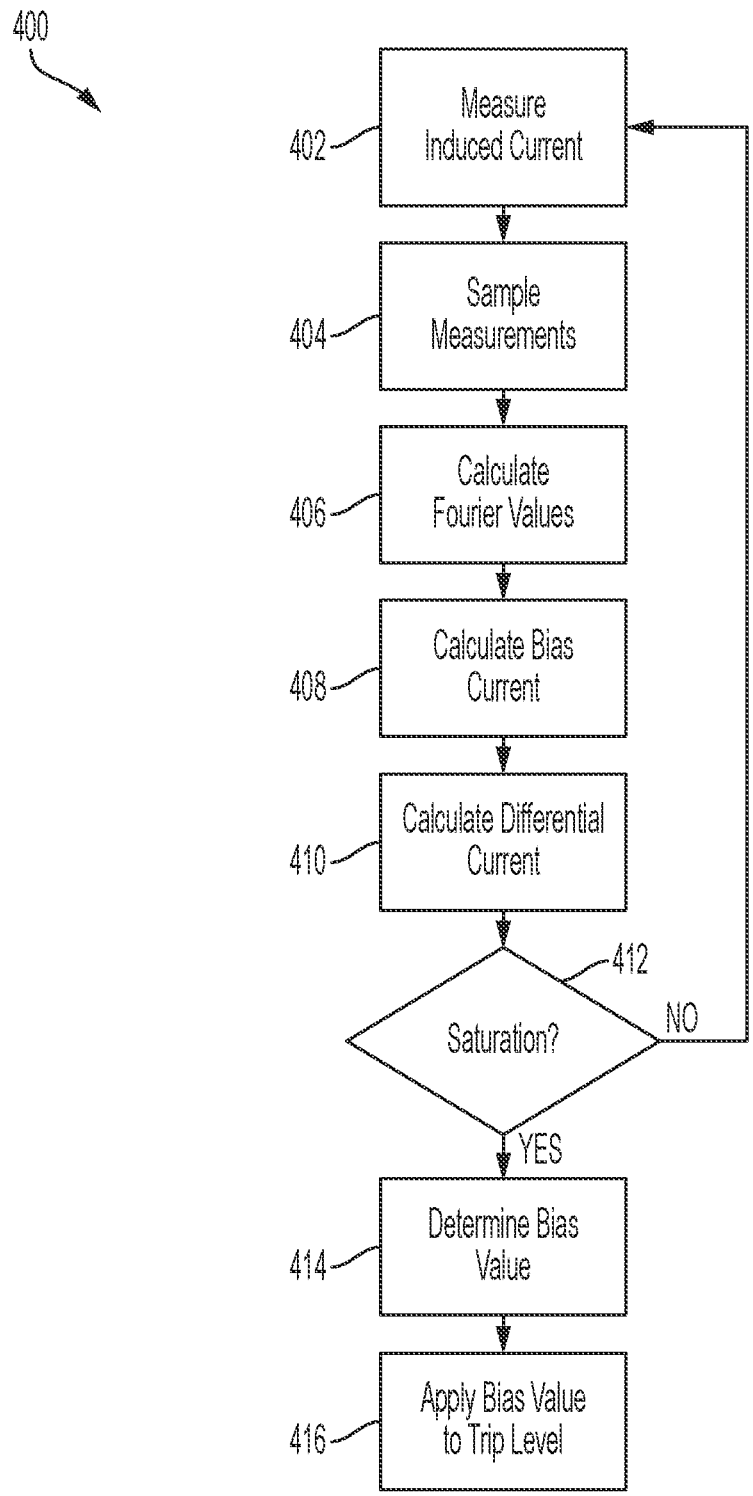
FIG. 4 illustrates a process for providing a saturation bias current to a differential element according to an example.

FIG. 4 illustrates a process 400 for modifying a trip level of a circuit by a bias value according to an example. The process 400 may be executed by the circuits described herein.

At act 402, induced currents in one or more current transformers are measured, for example current transformers 202a, 202b. The induced currents may be measured by measurement circuits, for example measurement blocks 204a, 204b. In some examples, measurement may be performed by providing the induced current to a resistor and measuring the voltage drop across the resistor. The process 400 may then continue to act 404.

At act 404, the induced current measurements are sampled. In some examples, the induced current measurements may be sampled by an ADC, for example ADC 306. The induced current measurements may be digitized and stored in registers, memory, or other storage. In some examples, digitization may be performed by the ADC 306 and digital filter 308, and the memory may be the registers or memory of the tracked samples circuit 308. Additional data relating to the frequency of the samples may also be collected, associated with the respective samples, and stored for use. The collection, association, and storing of the foregoing data may be carried out by the measurement blocks, for example, measurement blocks 204a, 204b, 300. A controller 210 may provide control signals to the measurement blocks 204a, 204b to manage the sampling process, including collecting, associating, and storing the samples, and using the samples in any way described herein. The process 400 may then continue to act 406.

At act 406, Fourier values are calculated. The calculations of the Fourier values may be based on the sampled values described in act 404. In some examples, the controller 210 may directly calculate the Fourier values. In some examples, a Fourier calculation circuit, such as the Fourier measurement circuit 312, may calculate the Fourier values and provide the Fourier values to the controller 210 or another circuit. Once the Fourier values are calculated, the process 400 may continue to act 408.

At act 408, the bias current is calculated. In some examples, the controller 210 calculates the bias current. In some examples, a specific circuit, for example the differential function circuit 206, may perform the calculation. The bias current may be calculated using the Fourier values calculated in act 406. The process 400 then continues to act 410.

At act 410, the differential current is calculated. In some examples, the controller 210 calculates the differential current. In some examples, a specific circuit, for example the differential function circuit 206, may perform the calculation. The differential current may be calculated using the Fourier values calculated in act 406. The process 400 then continues to act 412.

At act 412, a determination is made as to whether an element of the system 100 is experiencing saturation. A controller, such as the controller 210, or a different circuit, for example the differential function block 206, may determine whether saturation is occurring or has occurred. The determination of whether saturation exists may be made by determining that the bias current is decreasing and that the differential current is non-zero or above a threshold value. If no saturation exists (412 NO) the process 400 may return to act 402 and repeat acts 402-412 until saturation is detected. If saturation exists (412 YES), the process 400 continues to act 414.

At act 414, the bias value is calculated. In some examples, the bias value may be determined using equations (4) and (5) discussed with respect to FIG. 2. In some examples, the bias value may be based on the differential current, change in bias current, previous bias current, and/or previous bias value. In some examples, the controller 210 calculates bias value. In some examples, another circuit, such as the differential function circuit 206, calculates the bias value. Once the amount of bias value is determined, the process 400 continues to act 416.

At act 416, the bias value is added to the trip level of the circuit executing the process 400. In some examples, the controller 210 may perform the modification of the trip level by adding the bias value to the trip level. In some examples, other parts of the system 100, 200 for example, the differential function circuit 206, may modify the trip level by adding the bias value to the trip level. The bias value may change over time and/or be provided for a finite amount of time based on the saturation time constant. The saturation time constant may be greater than the system time constant. In some examples, the saturation and system time constants may be values that can be set by a user, or may be values designed into the system.

In various examples, no blocking of the differential elements (and/or including the measurement blocks 204a, frequency tracking block 208, and/or differential function block 206, and so forth) may be necessary using the process 400. In various examples, the process 400 requires only the use of a single algorithm—namely, the algorithm comparing the differential and bias currents and calculating the bias value. As a result, the process 400 requires less processing power and computational time compared to existing methods. In some examples, more and/or different algorithms may be combined with the single algorithm if desired. The acts described with respect to process 400 may occur in any order, and need not occur in only the order presented. For example, acts 408 and 410 may be executed in reverse of the order presented or simultaneously/in parallel, as could acts 404 and 406. In some examples, the acts may be pipelined such that certain parts of each act of the process 400 occur at the same time. That is, act 404 may begin and continue, and act 406 may begin as soon as sufficient samples have been taken in act 404 for calculation of the Fourier values to begin. As Fourier values are calculated, acts 408 and 410 may begin to calculate the bias and differential currents. In this way, the acts of the process 400 may occur in pipelined fashion.

Various controllers, such as the controller 210, may execute various operations discussed above. Using data stored in associated memory and/or storage, the controller 210 also executes one or more instructions stored on one or more non-transitory computer-readable media, which the controller 210 may include and/or be coupled to, that may result in manipulated data. In some examples, the controller 210 may include one or more processors or other types of controllers. In one example, the controller 210 is or includes at least one processor. In another example, the controller 210 performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A system for modifying a trip level of a circuit, the system comprising:
    a protection device configured to activate responsive to a differential current exceeding the trip level;
    a first current transformer coupled to an input of the circuit;
    a second current transformer coupled to the output of the circuit;
    at least one measurement circuit coupled to the first current transformer and to the second current transformer, the at least one measurement circuit being configured to
        obtain a first current measurement from the first current transformer,
        obtain a second current measurement from the second current transformer,
        determine a bias current based on the first current measurement and the second current measurement, and
        modify the trip level of the protection device by a bias value, the bias value being based on a maximum of the differential current, a previously determined bias value, and a multiple of a change in the bias current.

2. The system of claim 1, wherein the trip level is increased responsive to the at least one measurement circuit determining that the differential current is non-zero and the bias current is decreasing.

3. The system of claim 1, wherein modifying the trip level of the protection device includes adding the bias value to the trip level.

4. The system of claim 3, wherein the bias value decays at an exponential rate based on a time constant that is greater than a system time constant.

5. The system of claim 1, wherein the at least one measurement circuit further comprises:
    a first measurement block coupled to the first current transformer and configured to measure and sample a first current;
    a frequency tracking circuit coupled to the first measurement block and configured to track a frequency of the first current; and
    a differential function circuit coupled to the first measurement block and configured to calculate one or more of a differential current, the bias current, and a bias value.

6. The system of claim 5, wherein the first measurement block further comprises:
    an anti-aliasing filter coupled to the first current transformer and configured to prevent quantization errors when obtaining the first current measurement;
    an analog-to-digital converter (ADC) coupled to the anti-aliasing filter and configured to sample and digitize the first current measurement;
    a digital filter coupled to the ADC and to the frequency tracking circuit and configured to compensate for a frequency response of at least the ADC;
    a tracking circuit coupled to the digital filter and to the frequency tracking circuit and configured to sample a frequency of the first current measurement; and
    a Fourier measurement circuit coupled to the tracking circuit and to the differential function circuit and configured to calculate Fourier values based on the first current measurement.

7. The system of claim 5, further comprising a second measurement block coupled to the second current transformer, the frequency tracking circuit, and the differential function circuit.

8. The system of claim 1, wherein the at least one measurement circuit is further configured to modify the trip level responsive to determining that a transformer coupled to the circuit is saturated.

9. The system of claim 8, wherein the at least one measurement circuit is further configured to determine that the transformer is saturated based on the differential current.

10. The system of claim 9, wherein the differential current is based on a sum of the first current measurement and the second current measurement.

11. The system of claim 9, wherein the at least one measurement circuit is further configured to determine that the transformer is saturated based on a reduction in the bias current.

12. A method of modifying a trip level of a circuit, the method comprising:
    measuring an induced current from a current transformer to obtain an induced current measurement;
    converting the induced current measurement to a voltage;
    sampling the voltage to obtain voltage samples;
    calculating one or more Fourier values based on the voltage samples;
    calculating a bias current responsive to calculating the one or more Fourier values;
    calculating a differential current responsive to calculating the one or more Fourier values;
    determining if a transformer is experiencing saturation responsive to calculating the bias current and the differential current; and
    modifying a trip level of a protection device by a bias value responsive to determining the transformer is experiencing saturation, the bias value being based on a maximum of the differential current, a previously determined bias value, and a multiple of a change in the bias current.

13. The method of claim 12, further comprising determining that the transformer is experiencing saturation based on the bias current.

14. The method of claim 12, further comprising determining that the transformer is experiencing saturation based on the differential current.

15. The method of claim 12, wherein modifying the trip level of the protection device includes adding the bias value to the trip level.

16. The method of claim 15, wherein the bias value added to the trip level decays at an exponential rate based on a time constant that is greater than a system time constant.

17. The method of claim 12, further comprising providing the voltage samples to an anti-aliasing filter to prevent a quantization error responsive to converting the induced current measurement to the voltage.

18. The method of claim 12, wherein determining the differential current and determining the bias current are based on the Fourier values.

19. A non-transitory computer-readable medium storing thereon instructions configured to instruct at least one processor to:
  measure an induced current from a current transformer to obtain an induced current measurement;
  convert the induced current measurement to a voltage;
  sample the voltage to obtain voltage samples;
  calculate one or more Fourier values based on the voltage samples;
  calculate a bias current responsive to calculating the one or more Fourier values;
  calculate a differential current responsive to calculating the one or more Fourier values;
  determine if a transformer is experiencing saturation responsive to calculating the bias current and the differential current; and
  modify a trip level of a protection device by a bias value responsive to determining that the transformer is experiencing saturation, the bias value being based on a maximum of the differential current, a previously determined bias value, and a multiple of a change in the bias current.

20. The non-transitory computer-readable medium of claim 19, the instructions further instructing the at least one processor to determine that the transformer is experiencing saturation based on the bias current.

21. The non-transitory computer-readable medium of claim 19, the instructions further instructing the at least one processor to determine that the transformer is experiencing saturation based on the differential current.

22. The non-transitory computer-readable medium of claim 19, the instructions further instructing the at least one processor to modify the trip level of the protection device by adding the bias value to the trip level.

23. The non-transitory computer-readable medium of claim 22, wherein the bias value added to the trip level decays at an exponential rate based on a time constant that is greater than a system time constant.

24. The non-transitory computer-readable medium of claim 19, the instructions further instructing the at least one processor to determine the differential current and the bias current based on the one or more Fourier values.

* * * * *